United States Patent [19]

Kuroki

[11] Patent Number: 4,595,267
[45] Date of Patent: Jun. 17, 1986

[54] METHOD OF SENDING AND RECEIVING SIGNALS IN PHOTOGRAPHY WITH CAMERA AND CAMERA FLASH DEVICE FOR THAT METHOD

[75] Inventor: Yoshifumi Kuroki, Tokyo, Japan

[73] Assignee: Asahi Kogaku Kogyo Kabushiki Kaisha, Tokyo, Japan

[21] Appl. No.: 384,514

[22] Filed: Jun. 3, 1982

[30] Foreign Application Priority Data

Jun. 9, 1981 [JP] Japan ................................. 56-88532

[51] Int. Cl.[4] ......................... G03B 7/00; G03B 15/05
[52] U.S. Cl. .................................... 354/413; 354/467; 354/145.1
[58] Field of Search .................... 354/32-35, 354/60 F, 127, 128, 139, 145, 149, 60 A

[56] References Cited

U.S. PATENT DOCUMENTS 4,315,679  2/1982  Nakamura et al. ............. 354/149 X
4,329,624  5/1982  Kamon et al. .................. 354/145 X
4,363,542  12/1982 Kondo et al. ................... 354/145 X

FOREIGN PATENT DOCUMENTS 0069134  5/1980  Japan ................................. 354/33
2041552  9/1980  United Kingdom ............. 354/33

Primary Examiner—William B. Perkey
Attorney, Agent, or Firm—Fleit, Jacobson, Cohn & Price

[57] ABSTRACT

This invention relates to a method of sending and receiving signals when taking photographs with flash by exchanging information obtained on the camera side and the flash side and flash device for this method.

Its aim is to take photographs with flash avoiding mutual interference between the camera signal and flash signal through control of the light emission on the flash side and by stopping the transmission of the flash signal to the camera side, while sending camera signal from the camera side to the flash side when sending flash signal generated on the flash side to the camera side.

4 Claims, 4 Drawing Figures

METHOD OF SENDING AND RECEIVING SIGNALS IN PHOTOGRAPHY WITH CAMERA AND CAMERA FLASH DEVICE FOR THAT METHOD

BACKGROUND OF THE INVENTION

Until now, a signal has been sent and received to decide an appropriate photographing condition between the camera and flash devices when taking a photograph with flash by sending camera signals as camera information to the flash side and by sending signals as flash information from the flash side where it is sent to the camera side.

In this case, if exchanged information is increased, it is suitable that terminals correspond in number, as sending and receiving signals are performed through terminals installed at the point where the camera and flash devices are engaged. Recently, a camera device has been automated greatly, and its construction is complicated. For this reason, the amount of information which is exchanged between the camera side and flash side tends to increase.

However, increasing the number of terminals for sending and receiving signals, corresponding to the increased amount of information, brings about some problems. That is, the attachment area for a camera hot shoe to attach a clip-on type flash device is extremely limited. Thus, not so many terminals can be attached to the tiny hot shoe. Also, electric insulation should be considered when adding only one terminal. Therefore, it creates difficulties in manufacturing and parts cannot be replaced, as existing parts cannot be used. This is true when connecting clip-on type flash device to the camera, and the number of conductors of a wire should be increased according to the amount of information. Existing connection wires cannot be used and connector terminals do not match each other.

SUMMARY OF THE INVENTION

Because the flash signal circuit generates the flash signal from said flash side, the common terminal must send said flash signal to pass it to the flash side, as well as sending the camera signal from the camera side to pass it to the flash side. The control circuit which stops sending said flash signal which passes said common terminal while sending said camera signal passing said common terminal are, according to this invention, integrated in the flash device for photography with flash by sending the flash information from the flash side to the camera side and sending the camera information from said camera side to the said flash side. A new signal can be sent from the flash side to the camera side and existing wires and the camera hot shoe can be used with this flash device.

As the flash signal circuit can generate pulse signal voltage, signal processing on the camera side can be facilitated on the camera side.

BRIEF DESCRIPTION OF DRAWINGS

Drawing No. 1 is a partial perspective view of fixing track to be attached to the flash device and hot shoe for this invention.

Drawing No. 2 is of an electric circuit drawing of this invention (in diagram form).

Figure 1:
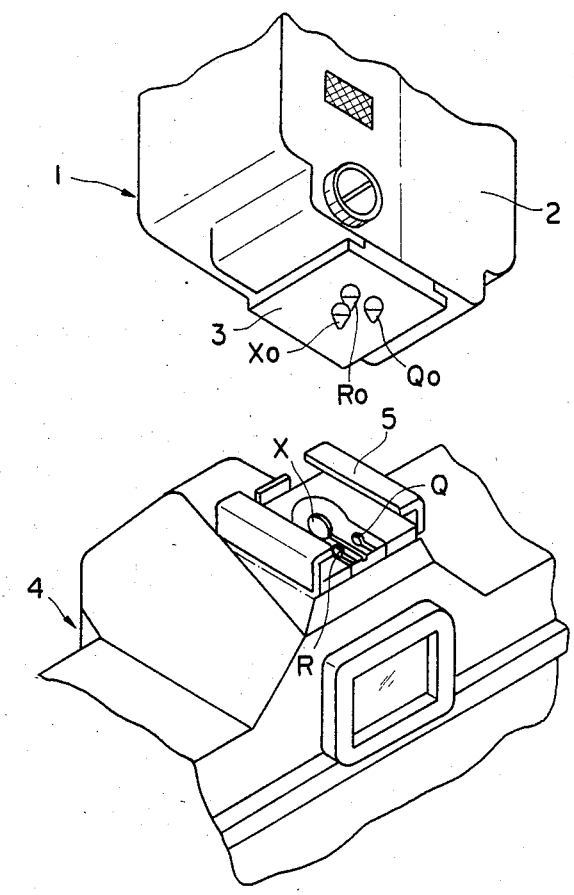
Figure 2:
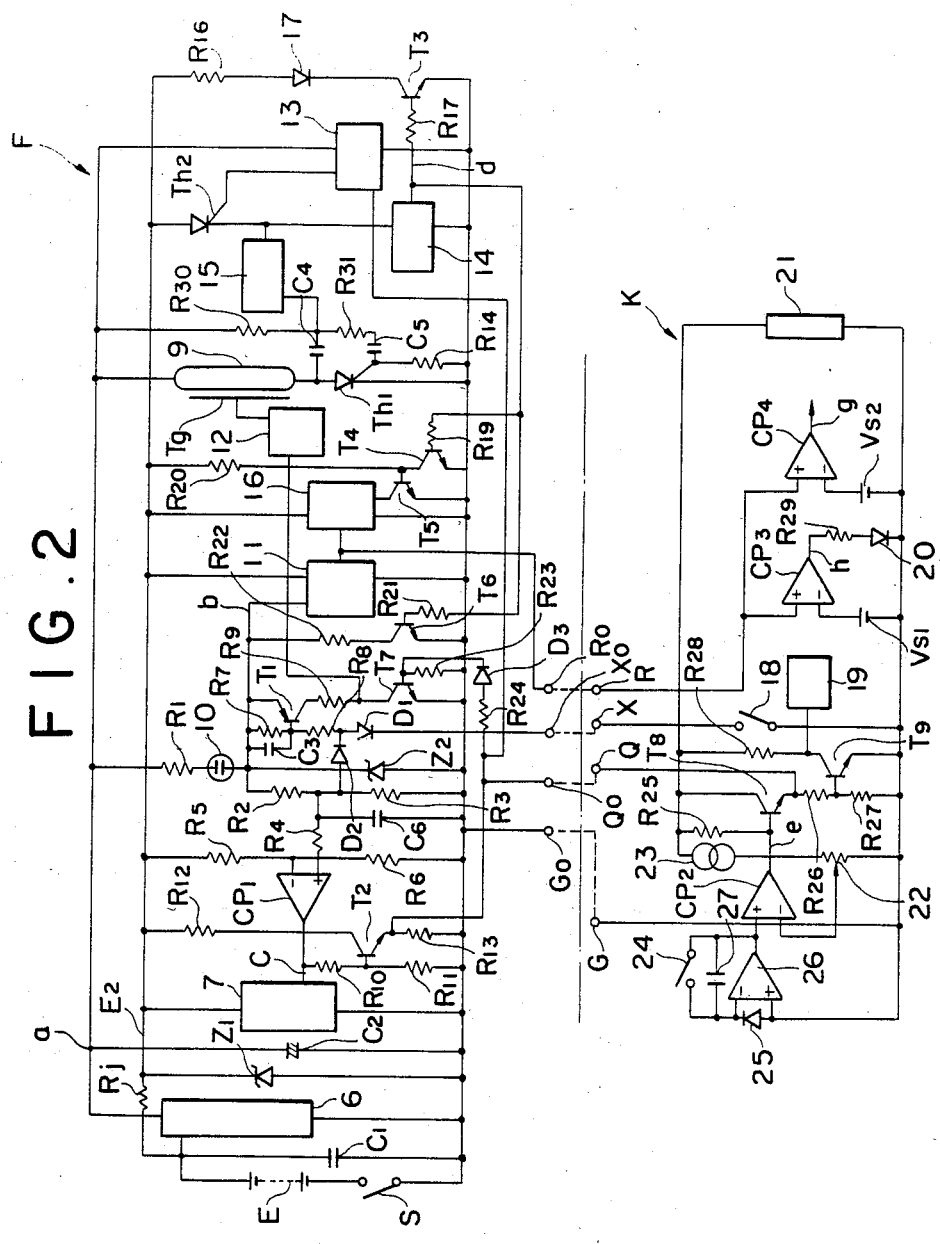
Figure 3:
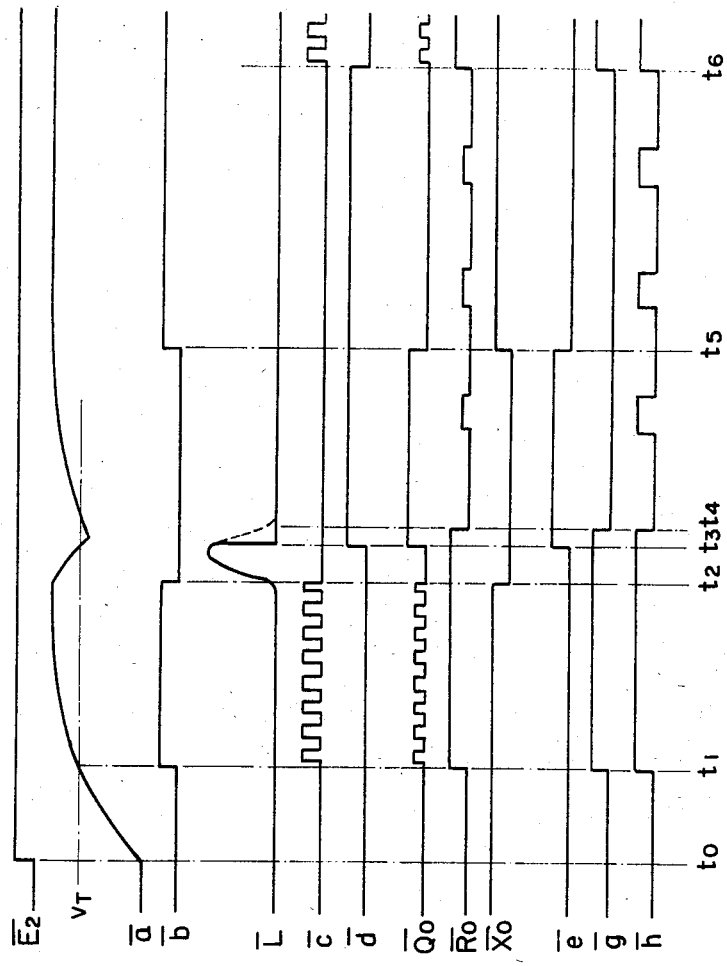
Figure 4:
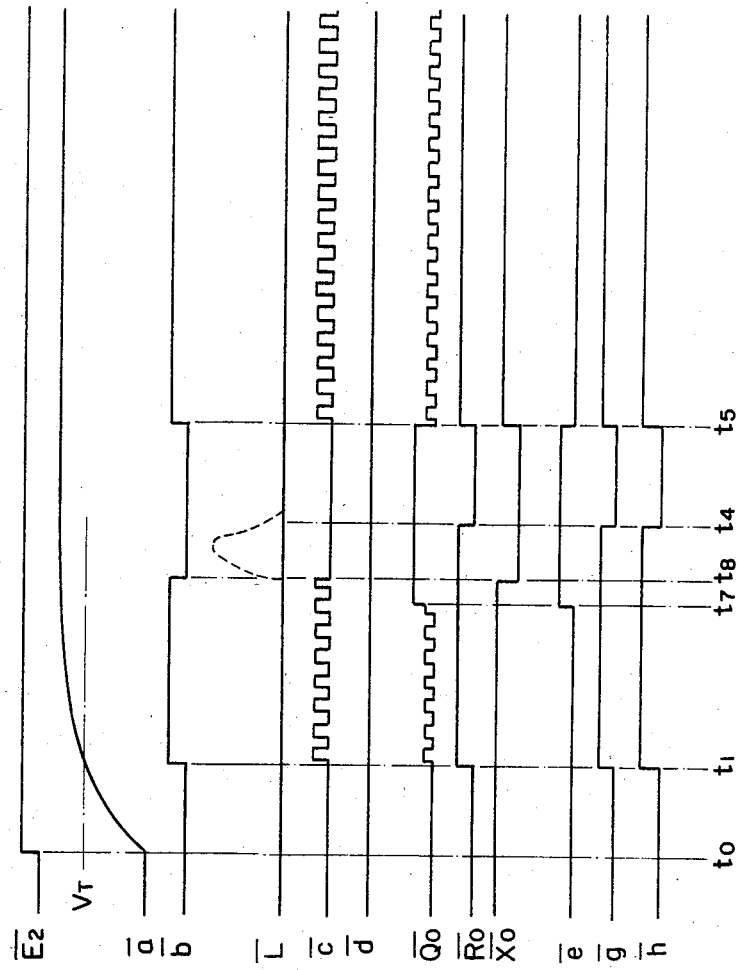

Drawing No. 3 is a time chart which shows the waveform of each part in drawing No. 2 when discharge light emission tube emits light due to closing of the X contact.

Drawing No. 4 is the time chart which shows the waveform of each part in drawing No. 2 when adequate exposure level is reached before X contact is closed.

DETAILED DESCRIPTION OF THE ILLUSTRATIVE EMBODIMENT

The following is a description of this invention with reference to the drawings:

Drawing No. 1 shows a practical example of clip-on device 1, and camera 4 to which the flash device 1 is attached and engaged.

A fixing track which has flash side terminals with springs X0, R0 and Q0 is attached under main body 2. This fixing track is engaged with hot shoe 5, installed on the upper part of camera 4 and said flash side terminals X0, R0 and Q0 are located corresponding to the camera side terminals X, R and Q of hot shoe 5, so that they can contact correspondingly. It is designed that engagement between fixing track 3 and hot shoe 5 causes the flash side grounding terminal G0 to contact the camera side grounding terminal G (not shown in the drawings), so that the flash side and camera side electric circuits can be grounded from the same terminal.

Drawing 2 shows flash side electric circuit F and the part of the camera side electric circuit K of this invention. Flash side electric circuit F will be explained. Firstly, battery E is connected to main switch S in series.

Condenser C1 is connected to this series circuit in parallel and converter 6, which converts battery E voltage to high-tension, is also connected there. Condenser C1 prevents wide fluctuation of power voltage when converter 6 is activated. Charging condenser C2 is connected between converter 6 output side and grounding side, and one of converter C2's terminals is connected to the high-tension side of discharge light emission tube 9; other terminals are connected to the flash side grounding terminal G0, together with each grounding side of condenser C1 and converter 6. Charging condenser C2 is charged from converter 6 to achieve light emission from discharge light emission tube 9. Furthermore, one of neon lamp 10's electrodes is connected to said converter 6 output side through current limit resistance R1; its other electrode is grounded at grounding terminal G0 through divided resistances R2 and R3 which are connected in series, and Zener diode Z2 cathode and the input side of charging completion signal circuit 11 are connected here also. Said Zener diode Z2 anode and one of charging completion signal circuit 11's terminals are grounded at terminal G0, and another circuit of said generation terminal 11 is connected to battery E's positive pole side. Zener diode Z1 cathode is connected to the connection point between said charging resistance Rj and said generation circuit 11 for voltage stability.

Thus, when charging condenser C2 is charged by closing said main switch S and charge is sufficient for light emission from said discharge light emission tube 9, neon 10 discharges and is turned on. When said Zener diode Z2 terminal voltage reaches Zener voltage by neon lamp 10 discharging, charging signal circuit 11 is activated to send charging signal to terminal R0 which is connected to the said generation circuit 11's output side.

Next, thyristor Th1's anode side is connected to the said discharge light emission tube 9's grounding side, and it is grounded. The trigger circuit 12's output side is connected to the said discharge light emission tube 9 trigger electrode Tg and transistor T7's collector is connected to its input side. This transistor T7 emitter is grounded and its base is grounded through resistance R23. Transistor T7's collector is connected to transistor T1's collector through resistance R9 and said transistor T1 emitter is connected to the connection point between said neon lamp 10 and divided resistance R2. Transistor T1 base is connected to the connection point between divided resistances R7 and R8. In addition, condenser C3 is connected in parallel to said divided resistance R7. The said divided resistance R8's grounding side is connected to the connection point between the diode D1 anode and diode D2 cathode. Said diode D2 anode is connected to the connection point between divided resistances R2 and R3 and diode D1 cathode is connected to terminal X0. This terminal X0 should be connected to the camera side X contact which will be described later. Thus, when X contact 18 is closed, transistor T1 is turned on (it is delayed until it is turned on by said condenser C3 and resistance R7) to activate said trigger circuit 12 and discharge light emission lamp 9 emits light.

Then, light adjustment circuit 13 is connected between output side and input side of said converter 6; this light adjustment circuit 13's input side is connected to terminal Q0 to which light adjustment signal (to be described later), as a camera signal from the camera side, and its output side is connected to the thyristor Th2 gate. This thyristor Th2 anode is connected to said Zener diode Z1 cathode and said thyristor Th2 cathode is grounded through timer circuit 14. The light emission termination circuit 15 output side is connected to said thyristor Th2 cathode and the light emission termination terminal 15 output side is connected to said thyristor Th1 anode through commutation condenser C4. The connection point between divided resistances R30 and R31 is connected to the connection point between commutation condenser C4 and light emission termination circuit 15. One divided resistance 30 high-tension side is connected to the converter 6 output side and another divided resistance R31 grounding side is connected to said thyristor Th1 gate through coupling condenser C5 and this gate is grounded through resistance R14. With said light adjustment circuit 13, it is optional to use light adjustment signal which is sent from the camera side through terminal Q0 to obtain light adjustment signal by activating the light receiving element which is omitted in drawing. It is designed to judge appropriate exposure according to light adjustment signal which is obtained by reflected light when flash is reflected off of a subject to activate light emission termination circuit 15 so that discharge light emission tube 9 terminates light emission.

Thus, for example, when light adjustment signal is sent from the camera side to terminal Q0, light adjustment circuit 13 is activated to supply trigger voltage to the thyristor Th2 gate; said thyristor Th2 is turned on to activate light emission termination circuit 15, and thyristor Th1 is turned off to terminate light emission from discharge light emission tube 9 by discharging commutation condenser C4.

Next, light adjustment display signal generating circuit 16 is connected to said Zener diode Z1 in parallel, transistor T5 is connected to this signal generation circuit 16 input side; said transistor T5 emitter is grounded. Its base is connected to Zener diode Z1 cathode through resistance R20. Transistor T5's base is connected to transistor T4 collector, said transistor T4 emitter is grounded, and its base is connected to said timer circuit 14 output side. Said timer circuit 14 side is connected to transistor T6 base through resistance R21. This transistor emitter is grounded, and it collector is connected to transistor T1 emitter.

Thus, the said timer circuit 14 is activated and the level of its output becomes high, transistor T4 is turned on to turn off transistor T5, and output of said light adjustment display signal generating circuit 16 is obtained. In this case, diode D1 cathode is grounded as X contact is closed and the level of said charging completion terminal circuit 11 becomes low as the terminal voltage of Zener diode Z2 lowers. However, it is designed so that output of said circuit 11 will be low-level after fixed time (i.e. after 2 ms).

Resistance R18 and light emitting element 17 are connected in parallel to Zener diode Z1 cathode; transistor T3 collector is connected to said light emitting element. Said transistor T3 emitter is grounded and its base is connected to timer circuit 14 output side.

Thus, when timer 14 is activated to turn off transistor T3, light emitting element 17 emits light, as timer circuit 14 is activated by light adjustment circuit 13; consequently, light emitting element 17 displays the operation status of light adjustment circuit 13. Then, iris information signal circuit 7 is connected to said Zener diode Z1 in parallel, its output side is grounded through divided resistances R10 and R11, which are connected in series. Transistor T2 base is connected to the connection point of resistances R10 and R11. Its collector is connected to Zener diode Z1 cathode, and its emitter is grounded through resistance R13 Comparator Cp1's output terminal is connected to the output side of said iris information signal circuit. The connection point between divided resistances R5 and R6, which are connected in series, is connected to the inversion input terminal of this comparator Cp1. These divided resistances R5 and R6 are connected to Zener diode Z1 in parallel with resistance R6 side grounded. Said comparator Cp1's non-inversion terminal is connected to divided resistances R2 and R3's connection point through resistance R4 and said connection point is grounded through condenser C6. Further, said transistor T2 emitter is connected to terminal Q0, resistance R24, which is connected in series, and diode D3 are connected to said terminal Q0, and said D3 cathode is connected to transistor T7 base. Said iris information signal 7 is to generate flash signal to be sent from the flash side to the camera side. It is, for instance, composed of astable multi-vibrator, and its output frequency is established to correspond to, for instance, the camera iris value. This iris information signal is integrated to obtain light receiving unit which receives reflected light from a subject through light emission from discharge light emission tube in flash device 1 and to obtain the circuits which send light adjustment signals to the flash side. It is also to connect said flash device 1 to the camera to which automatic iris control lens can be attached and to perform control before photography.

For this iris information signal circuit 7, iris information signal is sent to terminal Q0 from transistor T2 emitter only when the level of comparator Cp1 output is high. This is, said comparator Cp1 composes the control which controls sending iris information signal to terminal Q0. When said main switch S is closed, the level of inversion input terminal of comparator Cp1 is higher than that of non-inversion. Comparator Cp1's output terminal is low-level, thus, the level of iris information signal circuit 7's output side is low, then charging condenser C2 is charged and neon lamp 10 is turned on. The level of Cp1 non-inversion input terminal becomes higher than that of inversion input terminal after fixed time for the integration circuit composed of condenser C6 and resistance R3. This occurs when Zener diode 22 reaches Zener voltage and comparator Cp1's output terminal becomes high. Thus, output of said iris information signal circuit 7 starts to be sent to terminal Q0 through transistor T2. Transistor T2 output voltage is determined by Zener diode Z1 and resistances R10, R12 and R13. And, furthermore, load resistance (omitted in drawing) of light adjustment circuit 13, etc. A signal (iris information signal), which is sent to terminal Q0 from iris information signal circuit 7, is also sent to the input side of said light adjustment circuit 13. Operation of light adjustment circuit 13 is not affected, even when iris information signal is sent before discharge of light emission tube 9. This is because light adjustment circuit 13 includes a switch means (not shown) through which power can be supplied to it from the converter 6. The switch is open or closed in response to the discharge of light emission tube 9, so that power is to be supplied to said light adjustment circuit 13 after discharge of light emission tube 9. That is, when camera 4's X contact 18 is closed to activate trigger circuit 12.

Above is in regard to construction of electric circuit F, which shows a practical example of flash device 1 of the invention. Next, camera 4 electric circuit K's construction example will be briefly described. Camera 4 is to be connected to the flash device 1 for this device.

For light receiving diode 25, which receives reflected light from a subject, its cathode is connected to the non-inversion input terminal of computing amplifier 26, and light receiving diode 25 anode is connected to its inversion input terminal. Switch 24, which is opened, synchronizing with camera 4 shutter and integrated condenser 27 are connected in parallel between the non-inversion terminal & output terminal of said computing amplifier 26. Volume 22 divided terminal, which can set voltage corresponding to film's sensitivity, is connected to inversion input terminal of said computing amplifier 26. Furthermore, the non-inversion input terminal of comparator Cp2 is connected to the output terminal of said computing amplifier 26, and the said volume 22 output terminal is connected to its inversion input terminal. Transistor T8's base is connected to comparator Cp2's output terminal. Resistance R25 is connected between this transistor T8 and T8 collector and base. Constant current supply 23 is connected between that collector and one of said volume 22's terminals, and its emitter is connected to the camera side terminal Q and grounded through divided resistances R26 and R27 which are connected in series.

Transistor T9 base is connected to the connection point between said resistances R26 and R27, its collector is connected to said transistor T8 collector, and its emitter is grounded. The iris information signal circuit 19 is connected to transistor T9 collector and low voltage power supply 21 is connected between one of said resistance R28's terminals and transistor T9's emitter. Each non-inversion input terminal of comparator Cp3 and comparator Cp4 is connected to the camera terminal R and constant voltage supply Vs1 and Vs2 are connected between each inversion input terminal of comparators Cp3 and Cp4 and grounding terminal G, resistance R29, which is connected in parallel, and light emitting diode 20 are connected to comparator Cp3's output terminal and said light emitting diode 20 cathode is grounded.

Thus, when switch 24 is opened, synchronized with the camera shutter opening, integration is started by integrated condenser 27 and computing amplifier 27 and amplifier 26 and the flash, emitted from discharge light emission tube 9 when contact 18 is closed, throwing light on a subject. Light emitting diode 25 received that reflected light and the level of comparator Cp2's output terminal becomes low-level from high when the light emission level from discharge light emission tube 9 reaches an adequate exposure level. Thus, transistor T8 is turned on to send light adjustment signal as camera signal to terminal Q, and this signal is started to be sent to light adjustment circuit 13 through the flash side terminal Q0. That is, terminal Q0, which is composed of the common terminal to which flash and camera signals are sent.

Next, the effects of this invention will be explained using the time chart in drawings 3 and 4. First, in drawing 3, when main switch S is closed at optional time, t0 converter 6 is activated to charge condenser C2 and voltage of optional part a, terminal voltage of this condenser C2 changes similarly to waveform $\bar{a}$. In this case, voltage of optional part E2, terminal voltage Zener diode Z1, is like waveform E2. When voltage of part a reaches VT at time t1, neon lamp 10 is turned on and voltage of optional part b, terminal voltage of Zener diode Z2, becomes high-level, constant voltage as waveform $\bar{b}$. Said Zener diode Z2 cathode is connected to the charging completion signal circuit 11. Said circuit 11 supplies high-level voltage to terminal R0 by inputting this Zener Z2 voltage.

Then, as the voltage of the non-inversion input terminal of comparator Cp1 becomes higher than that of the inversion input terminal when the level of part b becomes high, the level of the comparator Cp1 output terminal high and waveform of part c becomes like that of $\bar{c}$ with iris information signal circuit 7 activated. Thus, signals shown in waveform $\overline{Q0}$ are supplied to terminal Q0. In this case, as the integrated circuit which is composed of condenser C6 and resistance R3 is connected to comparator Cp1 non-inversion input terminal through resistance R4, the level of part b becomes high and waveform $\bar{c}$ will come out at part c after a fixed time for said integrated circuit. Then, the camera is released and terminal X0 becomes low-level from high-level (waveform $\overline{X0}$). Transistor T1 is turned on after a fixed time for the integrated circuit, which is composed of resistance R7 and condenser C3 and it activates trigger circuit 12 to emit light from discharge light emission tube 9 (waveform $\bar{L}$). In this case, transistor T7 is off, as the level of its collector is high. When X contact 18 is closed, as the level of comparator Cp1's non-inversion input terminal become higher than that of inversion input terminal, the output terminal of iris information signal circuit 7 is short circuited and waveform $\bar{c}$ becomes constantly low-level.

On the other hand, the shutter is opened by release on the camera side to open switch 24. The output of light emitting diode 25, which received reflected light from the subject, caused by the light emission from discharge light emission tube 9, is integrated by computing amplifier 26. The level of part e becomes high, such as for waveform $\bar{e}$ when the level of the comparator Cp2's non-inversion input terminal becomes higher than that of inversion input terminal. That is, the light emission level from discharge light emission tube 9 reaches adequate level of exposure at time t3.

When the level of part e becomes high, transistor T8 is turned on to supply high-level voltage to terminals Q1 and Q0. It also activates light adjustment circuit 13 to supply the trigger voltage to thyristor Th2, and thyristor Th2 is turned on. Thus, light emission termination circuit 15 is activated so that thyristor Th1 is turned off to terminate the light emission from discharge light emission tube 9. As timer circuit 14 is also activated when thyristor Th2 is turned on, the level of timer 14's output terminal becomes high, as shown in waveform $\bar{d}$. This high level is maintained, for instance, for 1.5 sec. (from time t3 to t6)

When X contact 18 is closed, the level of part $\bar{b}$ becomes low from high, but the level of the charging completion signal circuit 11's output terminal becomes low after time t2, i.e. 2 ms (time t4). At this time, discharge light emission tube 9 emits all its light (see dotted line part of waveform $\bar{L}$).

As timer circuit 14 is functioning at the time of t3 when light adjustment signal is sent from the camera side to the terminal Q0, transistor T4 is turned on and transistor T5 is turned off to activate light adjustment display signal generating circuit 16, and the pulse voltage with, i.e. 1:3 duty rate and Hz 2.5 frequency is sent to terminal R0 (waveform $\bar{R0}$).

The level of part b becomes high when X contact 18 is opened at time t5 (waveform $\bar{b}$). However, transistor T4 continues to be on, transistor T5 continues to be off, and transistor T6 continues to be on, as timer circuit 14's output terminal retains its high-level, and only light adjustment display signal will arise out of terminal R0.

When the level of timer circuit 14's output terminal becomes low, transistor T6 is turned off so that the level of comparator Cp1's output terminal becomes high and iris information signal is started to be sent to terminal Q0.

Next is a description of the time chart in drawing 4. On the camera side, switch 24 is opened with the opening of the shutter when light receiving diode 25 received natural light from the subject and the level of comparator Cp2's output terminal becomes high (see waveform $\bar{e}$ at time t7) before X contact 18 is closed, discharge light emission tube does not emit light, as high-level signal at terminal Q0 turns on transistor T7, and the level of trigger voltage which is supplied to trigger circuit 12 is low, even when X contact is closed and transistor T1 is turned on (see waveform $\bar{L}$) at the time t8. In drawings 3 and 4, waveforms g and h are those for parts g and h of comparators Cp4 and Cp3 output terminals.

Having thus described this invention, what is claimed is:

1. A method for transmitting signals between a photographic camera and a flash device for making flashlight photography, the camera and the flash device, respectively, having a plurality of electrical terminals through which signals are transmitted between the camera and the flash device, said method comprising the steps of:

transmitting an iris information signal, which signal is produced in said flash device and is composed of a periodic pulse train, to said camera through one of said electrical terminals of the flash device and through a corresponding one of said electrical terminals of the camera, for the purpose of setting an exposure level before photographing;

terminating said iris information signal upon closure of a contact of said camera;

generating in said camera a light adjustment signal upon detection of an appropriate level by a photometric circuit so as to stop the light emission from a discharge tube of said flash device; and supplying the light adjustment signal to the flash device through said corresponding one of said electrical terminals of the camera and through one of said electrical terminals of the flash device.

2. A flash system adapted to be connected through a plurality of electrical terminals to a photographic camera for flashlight photography and for conveying electrical signals therebetween, said camera including a shutter which is activated upon release of said camera, a photometric circuit for detecting an exposure level, said shutter including an iris having a variable opening; said system comprising:

a discharge tube for producing light emissions;

a trigger circuit for effecting discharge of said discharge tube;

means for producing a contact signal;

a first electrical terminal through which the contact signal is transmitted after release of the camera to activate the trigger circuit of the discharge tube in synchronism with the operation of the shutter;

means for producing a light adjustment signal;

a second electrical terminal through which the light adjustment signal is transmitted for terminating light emissions from said discharge tube, said light adjustment signal being produced upon detection of a predetermined exposure level by the photometric circuit;

means for producing an iris information signal when the voltage across a capacitor for energizing the discharge tube has reached a predetermined value to effect discharge of said discharge tube, said iris information signal being composed of a periodic pulse train, the cycle of which corresponds to the extent of opening of said iris; and a control circuit for transferring the iris information signal through said second electrical terminal, said control circuit being further operable to terminate the transfer of said iris information signal before discharge of light from said discharge tube.

3. In combination with a camera and a flash unit, wherein the camera includes a shutter which is activated upon release of the camera a photometric circuit for detecting an exposure level, said shutter including an iris having a variable opening, and the flash unit includes a discharge tube for producing light emissions, a trigger circuit for effecting discharge of said discharge tube, the improvement comprising:

means for producing a contact signal;

a first electrical terminal through which the contact signal is transmitted after release of the camera so as to activate the trigger circuit in synchronism with the operation of the shutter;

means for producing a light adjustment signal;

a second electrical terminal through which the light adjustment signal passes thereby to terminate light emissions from the discharge tube, said light adjustment signal being produced upon the detection of a predetermined exposure level by the photometric circuit;

means for producing an iris information signal when the voltage across the capacitor which energizes the discharge tube reaches a predetermined high value to effect discharge of the discharge tube, said iris information signal being composed of a periodic pulse train, the cycle of which corresponds to the extent of opening of said iris; and a control circuit for transferring the iris information signal through the second electrical terminal of the camera, said control circuit being operable to terminate the iris information signal before emission of light eminating from discharge of the discharge tube.

4. A photographic system including light emission control circuit for regulating the exposure level of photographic film, said system comprising:

a camera including a shutter which is activated upon release thereof wherein the shutter includes an iris having a variable opening;

a photometric circuit for detecting the magnitude of an exposure level;

a discharge tube for producing light emissions;

a triggering circuit for effecting discharge of the discharge tube;

means for producing a contact signal;

a first electrical terminal through which the contact signal is transmitted after release of the camera so as to activate the trigger circuit to effect discharge of the discharge tube in synchronism with the operation of the shutter;

means for producing a light adjustment signal;

a second electrical terminal through which the light adjustment signal is transmitted for terminating light emission from the discharge tube, the light adjustment signal being produced upon detection of a predetermined exposure level by the photometric circuit;

means for producing an iris information signal when the voltage across a capacitor which energizes the discharge tube reaches a predetermined value which effects light emissions from the discharge tube, said iris information signal being composed of a periodic pulse train, the cycle of which corresponds to the extent of opening of the iris; and a control circuit for transmitting the iris information signal through the second electrical terminal to the camera, said control circuit being further operable to terminate the iris information signal prior to light emissions of the discharge tube.

* * * * *